Patented Jan. 22, 1929.

1,700,032

UNITED STATES PATENT OFFICE.

HARVEY RANDOLPH DURBIN, OF LARCHMONT, NEW YORK, ASSIGNOR TO INTERNATIONAL CEMENT CORPORATION, OF NEW YORK, N. Y., A CORPORATION OF MAINE.

PRODUCTION OF PORTLAND CEMENT.

No Drawing. Application filed June 12, 1926. Serial No. 115,691.

This invention relates to the manufacture of Portland cement and it has for its object the production of improved Portland cement containing a silica alumina and any of the usual impurities such as iron or magnesia, in which the silica alumina and iron content are more completely saturated with lime than has hitherto been considered possible. The resulting cement obtained in accordance with this invention possesses remarkable early strength.

According to this invention Portland cement made in accordance with known methods is re-calcined to incipient fusion with additional free lime in quantities sufficient to substantially theoretically saturate the silica, alumina and iron therewith. Naturally somewhat less than that quantity of free lime necessary to theoretically saturate the silica, alumina and iron may be added to Portland cement clinker and the whole ground and burned to incipient fusion, but excess lime is detrimental and should be avoided. However, if a Portland cement clinker is found to possess a substantial quantity of free lime, such clinker can be ground and re-burned in accordance with this invention to produce a good clinker without the addition of more lime being strictly necessary. Obviously more lime can be incorporated into such a clinker also, provided an excess of lime over theory is avoided.

It is generally considered that the principal components of Portland cement are tricalcium aluminate ($3\ CaO.Al_2O_3$), tricalcium silicate ($3\ CaO.SiO_2$) and beta dicalcium silicate ($2\ CaO.SiO_2$). The minor components usually comprise magnesium oxide ($MgO$) and tricalcium ferrite ($3\ CaO.Fe_2O_3$), whilst gypsum ($CaSO_4.2H_2O$) is often present as an added constituent, and small quantities of carbon dioxide, alkalies, silica and water may occur.

The components possessing cementing qualities are the tri- and di- calcium silicates, although it is very probable that tricalcium aluminate and tricalcium ferrite possess cementing qualities to a small degree at any rate. Tricalcium silicate alone displays all the desirable characteristics of true Portland cement. Its hydrations proceed in an orderly manner and the addition of a retarder to control its reactions is usually unnecessary.

Dicalcium silicate, on the other hand, hydrates slowly and developes but little strength until after the lapse of several weeks.

The presence, therefore, of lower silicates of calcium tends to detract from the cementing qualities of the resulting Portland cement, and similarly it is desirable for the aluminates and ferrites to be in the highest form.

The ratio of combined silica ($SiO_2$) to combined lime ($CaO$) in the cement is known as the lime-silica index or factor. In the case of a cement comprising tricalcium silicate only the lime-silica index is 2.8. This is the highest form theoretically attainable but heretofore it has been impossible to produce a volume constant cement having a lime silica index of this value. Owing to the hitherto inevitable presence of the lower calcium silicates the index value has been less than 2.8 and consequently the resulting cement of less value than that desired. The presence of free lime is, of course, detrimental, and in considering the quality of a cement with reference to the lime-silica index only the thoroughness with which the lime-silica combinations have been perfected are taken into account.

Portland cement is the product obtained by finely pulverizing clinker produced by calcining to incipient fusion, an intimate and properly proportioned mixture of argillaceous and calcareous materials, and throughout the specification the expression "normal Portland cement clinker" is defined according to the above definition, taking into consideration the fact that heretofore normal Portland cement clinker comprises lower forms of lime-silica, lime-alumina and lime-ferrite.

Whilst the above discussion has endeavored to show theoretical reasons for the lack of consistency and slow hardening properties of present day Portland cement, it must not be assumed that the invention is limited on that account to the improvement of Portland cement in order to attain what appeared to be desirable results from theoretical considerations which at present are considered to be in order. It may be that the theoretical discussion of Portland cement as at present accepted is false, and in view of this the present invention must not be limited to within present day construction put upon the actions and reactions which take place in the production of high grade Portland cement.

In accordance with the above theoretical considerations the object of the present invention is to produce a cement which comprises the highest forms of lime-silica, lime-alumina and lime-ferrites, and this invention is based upon the observation that if normal Portland cement clinker containing lower forms of lime-silica, lime-alumina and lime-ferrite is treated with more calcium carbonate or calcium hydrate, or calcium oxide or a mixture of two or more of these latter compounds, and then burned to a clinker, the resulting product is a cement of exceptionally high strength and volume-constant.

It must of course be understood that an excess of lime in the final product is detrimental and therefore the present invention is limited to the presence of only sufficient lime to produce the highest grade of cement.

It is impossible to produce such a volume-constant cement by a single burning operation, and the fusion of cement rocks and the like prior to the addition of lime does not effect the desired result. The amount of lime or the like to be added to the normal cement clinker may be computed by analysis of the clinker and subsequent estimation of the requisite quantity of lime needed to produce the highest forms of silicate, aluminate and ferrite.

The normal cement clinker is advantageously ground to a sufficient fineness so as to ensure intimate contact with the added lime or the like. The lime may be admixed with the clinker in a dry pulverized state or may be sprayed in any suitable manner as milk of lime or chalk paste.

The burning operation is carried out in the manner usually employed for the burning of normal Portland cement clinker. The clinker resulting from the process according to the present invention is ground into cement and is found to be of exceptionally high tensile strength. If necessary, the burning operation with additional lime or the like may be repeated until the desired product is obtained.

In order that this invention may be clearly understood and readily carried into effect, the following data are given by way of examples:

Normal Portland cement clinker is admixed with 15% of carbonate of lime or sufficient to saturate the silica, alumina and iron, the whole being then ground and burnt to a clinker when a retarder such as gypsum may be added if necessary or desirable, and the product ground to cement. If the silica, alumina and iron oxide are not thoroughly satisfied in their affinity for lime the process is repeated.

The clinker used and the cement produced by this process are as follows:

|  | Knickerbocker clinker | Knickerbocker cement | Durbin cement |
|---|---|---|---|
| Silica | 23.46 | 22.36 | 20.58 |
| Alumina | 5.49 | 5.64 | 5.15 |
| Iron oxide | 2.89 | 2.66 | 3.51 |
| Lime | 64.55 | 63.53 | 65.31 |
| Magnesia | 3.13 | 3.14 | 3.18 |
| Sulphuric anhydrid | .12 | 1.72 | 1.51 |

*Tensile strength lbs. per sq. inch.*

| | | | |
|---|---|---|---|
| 1 day 1-3 sand | | 87 | 172 |
| 2 days 1-3 sand | | 87 | 226 |
| 3 days 1-3 sand | | 187 | 336 |
| 7 days 1-3 sand | | 308 | 428 |

|  | Houston clinker | Houston cement | Durbin cement |
|---|---|---|---|
| Silica | 24.60 | 23.56 | 21.70 |
| Alumina | 5.60 | 5.94 | 6.26 |
| Iron oxide | 2.72 | 2.46 | 2.70 |
| Lime | 66.30 | 63.90 | 66.20 |
| Magnesia | .83 | .84 | .86 |
| Sulphuric anhydrid | .13 | 2.03 | 1.33 |

*Tensile strength.*

| | | | |
|---|---|---|---|
| 1 day 1-3 sand | | 107 | 242 |
| 2 days 1-3 sand | | | 316 |
| 3 days 1-3 sand | | 187 | |
| 7 days 1-3 sand | | 267 | 400 |

It must be understood that the term "lime" employed throughout the claims includes all compounds which produce lime on heating.

What is claimed is:

1. The process for the production of an improved cement, which comprises mixing a Portland cement clinker containing a large proportion of tricalcium silicate and incompletely lime-saturated silicate, with substantially sufficient lime to complete the saturation of the incompletely saturated silicate in said clinker, burning the whole to a clinker and afterwards grinding said clinker to cement.

2. An improved process for the production of high grade cement which consists in intimately admixing a Portland cement clinker comprising a large proportion of tricalcium silicate and silicious compounds unsaturated with calcium, with lime in amounts not more than that necessary to complete the saturation of the silica therewith, burning the whole to a clinker and grinding said clinker to cement.

3. An improved process for the production of high grade cement which consists in intimately admixing a Portland cement clinker comprising a large proportion of tricalcium silicate and silicious compounds not completely saturated with calcium, by grinding said clinker with lime in substantial amounts but not more than that theoretically necessary to complete the saturation of the silicious compounds therewith, burning the whole to a clinker and grinding said clinker to cement.

4. An improved process for the production of high grade cement which consists in intimately admixing a Portland cement clinker comprising a large proportion of tricalcium silicate, free lime in substantial amounts and lower compounds of lime-silica, by grinding the clinker with lime, the total free lime content of the ground mass being not more than that theoretically necessary to complete the saturation of the lower lime-silica compounds, burning the whole to a clinker and grinding said clinker to cement.

5. The improved Portland cement having a tensile strength of at least 240 pounds per square inch at twenty-four hours with a one to three sand mixture and which is prepared by burning Portland cement clinker comprising a large proportion of tricalcium silicate together with incompletely lime-saturated silicate, in intimate admixture with lime in amounts not more than that necessary to complete the saturation of the incompletely saturated silicate therewith, and grinding the resultant clinker to cement.

In testimony whereof I affix my signature.

HARVEY RANDOLPH DURBIN.